L. KARPOW.
ELECTRIC RAT TRAP.
APPLICATION FILED JULY 15, 1911.

1,030,093.

Patented June 18, 1912.

3 SHEETS—SHEET 1.

WITNESSES:
Erich Burkly

INVENTOR.
L. KARPOW
BY
ATTORNEYS

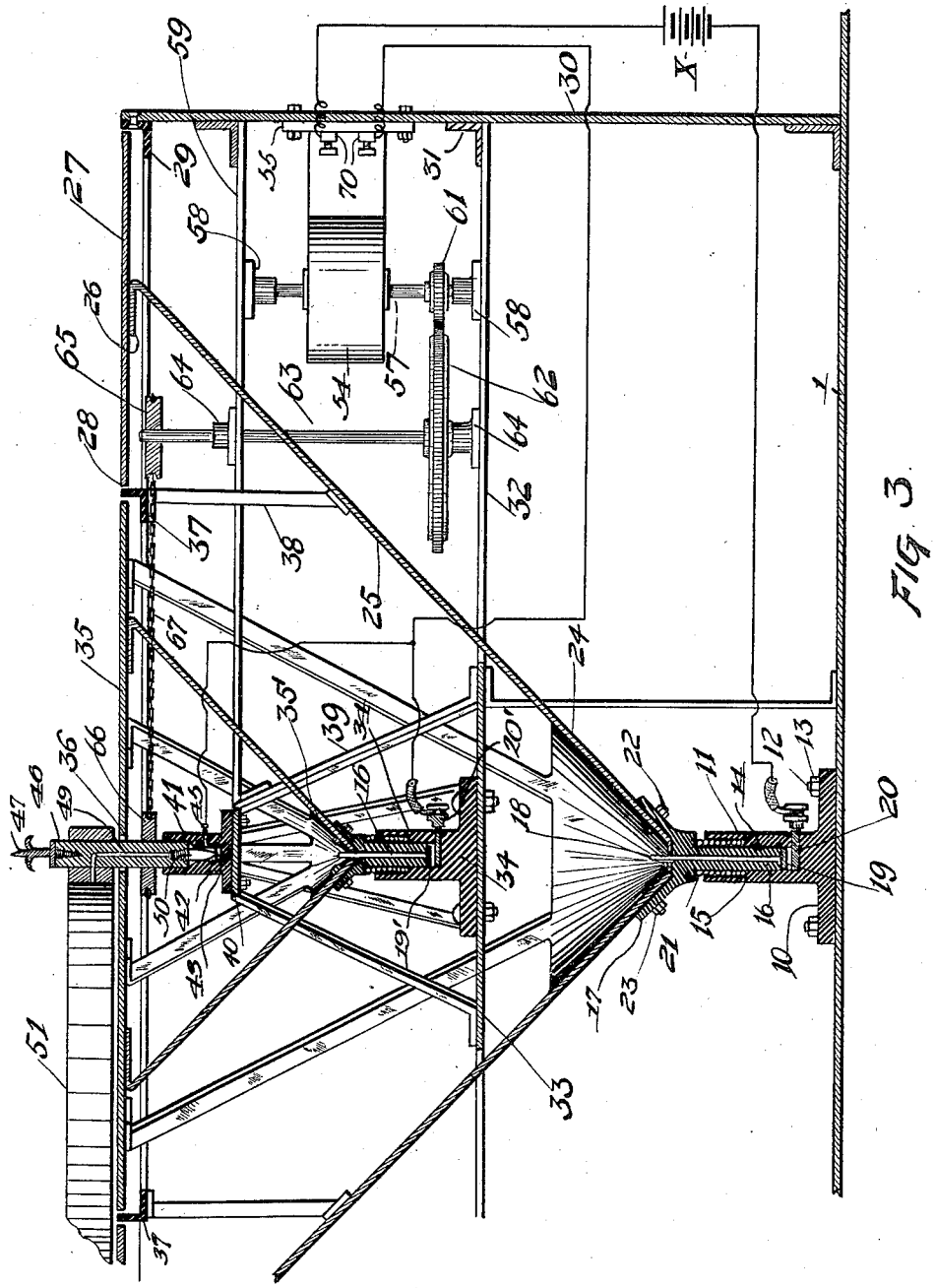

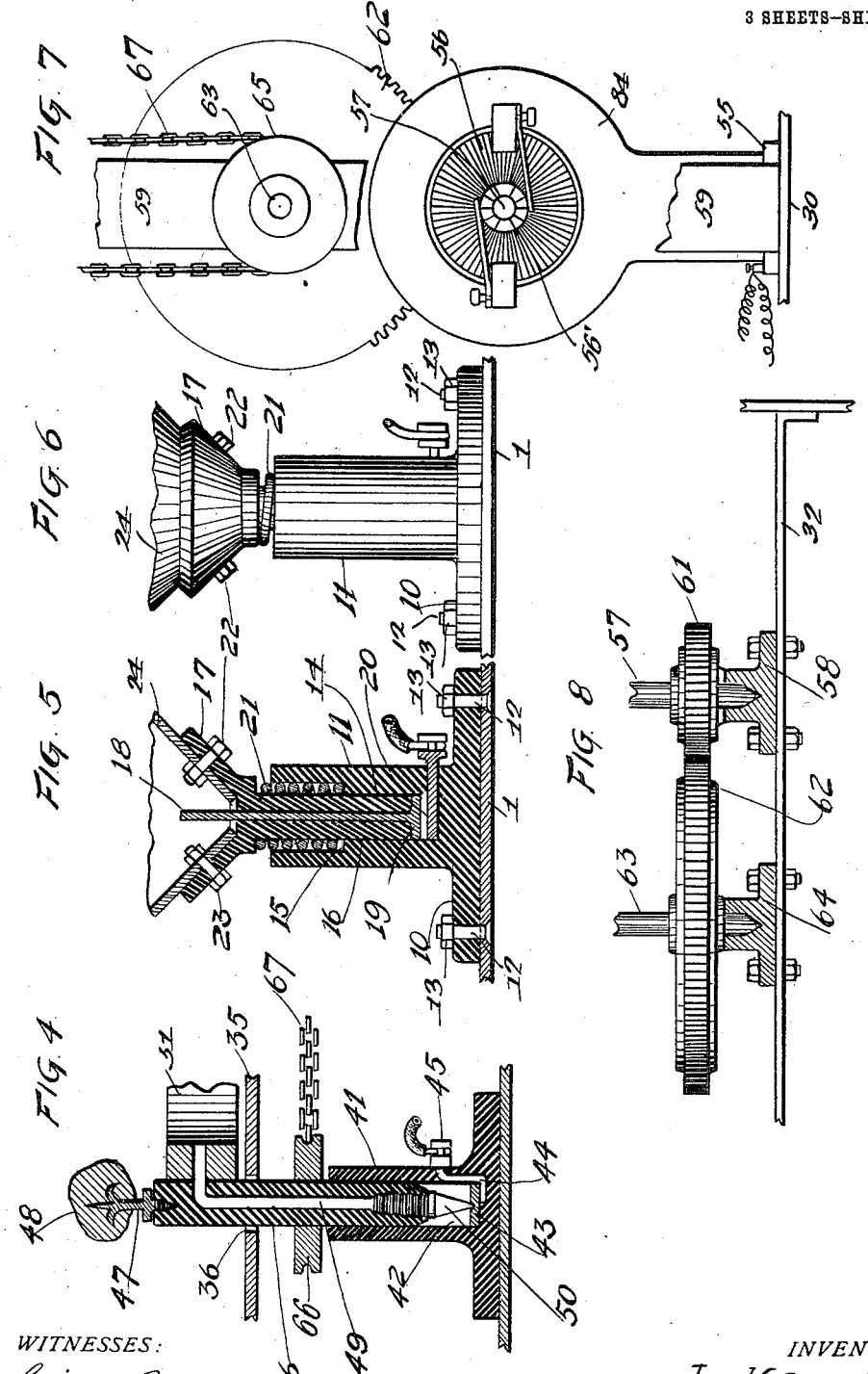

UNITED STATES PATENT OFFICE.

LEON KARPÓW, OF WINNIPEG, MANITOBA, CANADA.

ELECTRIC RAT-TRAP.

1,030,093.   Specification of Letters Patent.   Patented June 18, 1912.

Application filed July 15, 1911. Serial No. 638,666.

*To all whom it may concern:*

Be it known that I, LEON KARPÓW, subject of the Emperor of Austria-Hungary, residing at Winnipeg, Province of Manitoba, Canada, have invented certain new and useful Improvements in Electric Rat-Traps, of which the following is a specification, reference being had therein to the accompanying drawings.

This invention relates to electric rat traps, and the main objects of my invention are: First, to make use of a current of electricity, in a manner that is safe and economical, for electrocuting rats and other rodents. Second, to provide a trap with an electrically charged swinging arm that will remove the bodies of rats to a point within the trap from which they cannot be observed by other rodents. Third, to arrange a series of movable platforms in a manner that they will be actuated by the body of a rodent to complete electric circuits for operating the electrical devices of the trap. Fourth, to provide a trap of the above type that can be advantageously used in warehouses and buildings infested with rodents that destroy and mar merchandise.

I attain the above objects by a combination of mechanical elements that will be hereinafter specifically described and then claimed, and reference will now be had to the drawings wherein—

Figure 1:
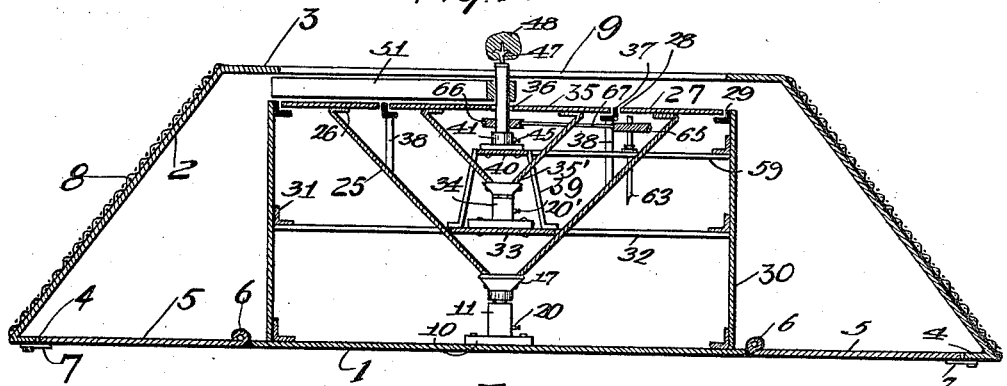
Figure 2:
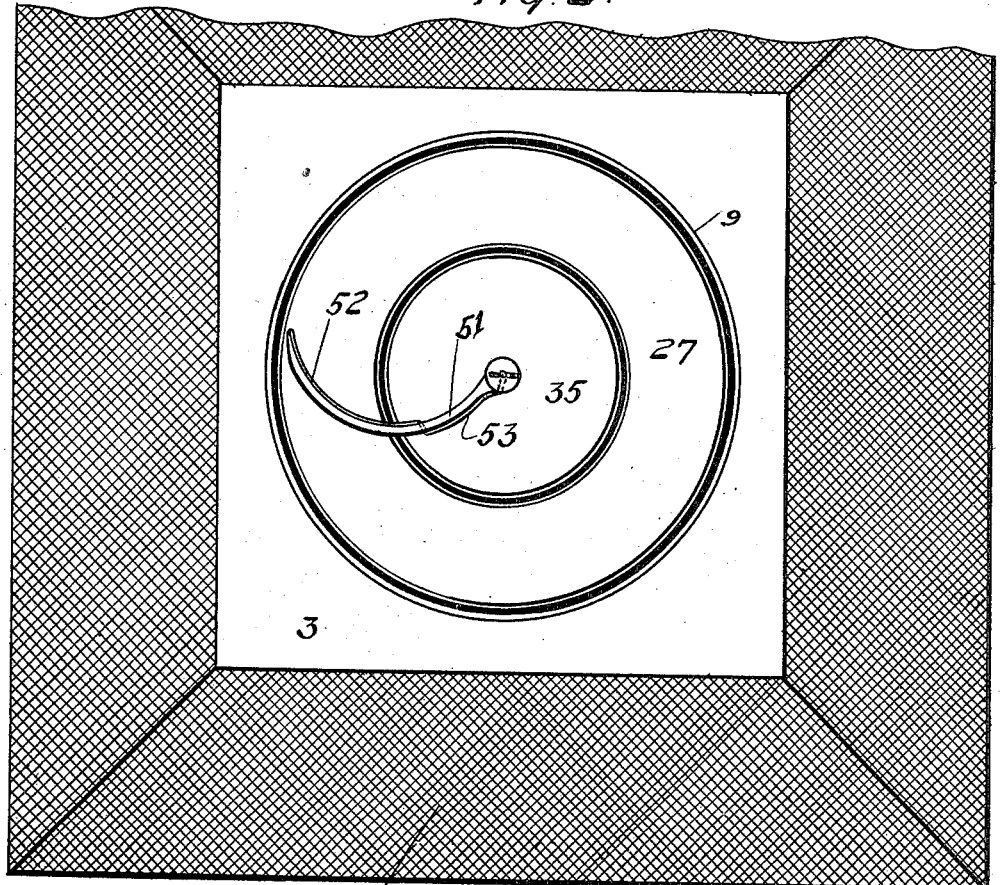

Figure 1 is a cross-sectional view of a portion of the trap in accordance with this invention. Fig. 2 is a plan of a portion of the same. Fig. 3 is an enlarged cross-sectional view of a portion of the trap. Fig. 4 is an enlarged detail sectional view of the pedestal of the swinging arm of the trap. Fig. 5 is a similar view of one of the pedestals of the movable platforms of the trap. Fig. 6 is a side elevation of the same. Fig. 7 is an enlarged plan of the motor of the trap, and Fig. 8 is an enlarged side elevation of a portion of the driving mechanism of the trap.

A trap in accordance with this invention comprises a frusto-pyramidical shaped housing having a bottom plate 1 inclined side walls 2, and a top plate 3. The bottom plate 1, adjacent to the edges thereof, is provided with doorways 4 and closing said doorways are doors 5 hinged to the inner edges of the doorways 4, as at 6, preferably in a manner that said doors can swing outwardly. The doors 5 are normally retained in a closed position by pivoted latches 7, carried by the bottom plate 1 at the outer edge of the doorways 4. The side walls 2 have the outer sides thereof covered with interwoven wire 8, whereby a rodent can easily obtain a foot purchase upon the side walls to climb to the top plate 3. The top plate 3 has a large circular opening 9. Mounted centrally of the bottom plate 1 is the base 10 of a pedestal 11, said pedestal being preferably secured to the bottom plate 1 by bolts 12 and nuts 13. The pedestal 11 has a socket 14 with the upper end thereof enlarged to provide an annular shoulder 15. Movably mounted in the socket 14 is a stem 16 having the upper end thereof provided with an inverted conical-shaped head 17. The stem 16 has a central pin 18 extending into the head 17. The lower end of the pin terminates at a contact piece 19, carried by the bottom of the stem 16 and this contact piece is adapted to engage a binding post 20 carried by the pedestal 11 and extending into the lower end of the socket 14. The stem 16 is surrounded by a coil compression spring 21 arranged between the head 17 and the shoulder 15, within the socket 14. The purpose of this spring is to normally maintain the stem 16 and the head 17 thereof in an elevated position, with the contact piece 19 out of engagement with the binding post 20.

Secured in the head 17 by bolts 22 and nuts 23 is an inverted conical shaped support 24 having the upper edges thereof provided with a plurality of equally spaced radially disposed arms 25. These arms have the upper ends thereof bent inwardly, as at 26, into a common horizontal plane and suitably mounted upon the upper ends of said arms is an outer circular platform 27 having a central opening 28. The platform 27 is arranged below the opening 9 of the top plate 3 and a downward movement of said platform is limited by a circular angle bar 29 carried by the upper ends of uprights 30 mounted upon the bottom plate 1. The circular angle bar 29 is preferably made of an insulation material. The uprights 30, at a point intermediate the ends thereof, are provided with inwardly projecting brackets 31 supporting the horizontal arms 32 of a spider 33. The central portion of the spider 33 is positioned within the arms 25 and the arms 32 of the spider project outwardly from between said arms 25.

Mounted centrally of the spider 33 is the pedestal of an inner circular platform 35, said platform having a central opening 36. The pedestal 34 is similar in all respects to the pedestal 14 and the support 35' of said pedestal is similar to the support 24, with the exception that the pedestal 34 and the support 35' are smaller than the pedestal 14 and the support 24 and is provided with a contact plate 19' and a binding post 20'. A downward movement of the inner circular platform 35 is limited by a circular angle bar 37, carried by uprights 38 mounted upon the arms 25. The circular angle bar 37 is positioned between the coöperating edges of the platforms 27 and 35 and is preferably made of insulation material or insulated from the uprights 38. Mounted upon the spider 33 are the converging legs 39 of a small stationary platform 40 arranged directly above the pedestal 34, the legs 39 extending between the arms of the support 35. Mounted upon the stationary platform 40 is a pedestal 41 having a socket 42 and in the bottom of said socket is a bearing plate 43 to which is connected the wire 44 of a binding post 45. Rotatably mounted in the socket 42 of the pedestal 41, and extending upwardly through the opening 36 of the inner platform 35 is a post 46 having the upper end thereof provided with a bait holder 47 for a bait 48. The lower end of the post 46 terminates at a point removed from the bearing plate 43, and mounted in the post 46 is a rod 49 having the lower end thereof screw-threaded and tapered, as at 50, in order to have a point bearing upon the plate 43. The upper end of the rod protrudes outwardly from the post 46 and is provided with a curved arm 51 adapted to be swung over the platforms 27 and 35. The arm 51 is made of wood or other insulation material and has the outer end thereof provided with a metallic contact plate 52 connected to the rod 49 by a wire 53.

Located upon the inner side of one of the uprights 30 is a motor of usual construction, consisting of the casing 54 mounted upon a base 55 and having a revoluble armature 56 mounted with its commutator 56' upon a vertical shaft 57, journaled in bearings 58 carried by one of the arms 32 of the spider 33 and a bar 59 carried by the upright 30 and one of the legs 39 of the platform 40.

Mounted upon the vertical shaft 57 is a small gear wheel 61 meshing with the large gear wheel 62 mounted on the vertical shaft 63, journaled in bearings 64, carried by bar 59 and the arm 32 of the spider 33. The upper end of the shaft 63 has a grooved pulley or sprocket wheel 65 and adapted to travel over this wheel and a similar wheel 66, carried by the post 46, is an endless belt or sprocket chain 67.

The connecting up of the motor as shown by the drawings includes a wiring between the binding post 20 and one of the terminal posts 70 of the motor while the other terminal post 70 of the motor is connected to both of the binding posts 20' and 45 for the purpose hereinafter set forth, while a suitable source of electrical energy such as the batteries X is included in the circuit. The stems 16 of the pedestals serve functionally as switches in connection with the binding posts 20 and 21' and when both of said pedestals are depressed the platforms 27 and 35 are in circuit electrically with the motor and batteries. Immediately upon the body of a rat running upon the outer platform 27, the stem 16 of the lower pedestal partially completes the circuit and when the rat steps onto the inner platform the stem of the upper pedestal is lowered and the circuit is completed through the rodent's body. This circuit is of sufficient strength to electrocute the rodent and to thereby place the motor in operation imparting a revoluble movement to the post 46 whereupon the arm 51 is swung to remove the rodent's body from the platforms 27 and 35. During this operation of the arm 51 the rodent passes over and in contact with the platform 27 which remains depressed and constitutes one terminal of the electric circuit even after the rodent leaves the other platform 35 and thereby interrupts that circuit, but the plate 52, of the arm 51 being connected to the same terminal of the motor, the said plate then becomes the active terminal and the contact of the rodent with said plate and the platform 27 continues the circuit uninterrupted so that the motor will continue in operation in revolving the arm 51 until the rodent has been thrown off into the receptacle formed by the walls 2.

Having thus described my invention, what I claim as new is—

1. In an electric rat trap, a housing having a bottom plate provided with door openings, and the top plate thereof provided with an opening, a pedestal located centrally of said housing, a circular platform movably supported by said pedestal, a spider arranged in said housing, a pedestal carried thereby, a circular platform movably supported by said pedestal, a platform arranged above the last mentioned pedestal, a post revolubly mounted upon said platform, an arm carried by the upper end of said post and adapted to swing over said circular platforms, a motor located in said housing and adapted to revolve said post, and means actuated by a movement of said circular platforms and adapted to control the operation of said motor during the passage of an electric current through the rat.

2. In an electric rat trap, a housing having the top thereof provided with an opening, a circular outer platform supported below said opening, a circular inner platform supported in a plane horizontal with said outer circular platform, an arm adapted to swing above said platforms, a motor located within said housing and adapted to operate said arm, and means actuated by a movement of said circular platforms and adapted to control the operation of said motor during the passage of an electric current through the rat positioned between said platforms.

3. In an electric rat trap, a housing having the top thereof provided with an opening, pedestals arranged in said housing, movable circular platforms supported by said pedestals, a revoluble post located centrally of said platforms, an arm carried by said post and adapted to swing above said platforms, an electric-motor arranged in said housing and adapted to revolve said post, and means actuated by a movement of said platforms to complete a circuit through said motor and to electrically charge said arm during the passage of an electric current through the rat positioned between said platforms.

In testimony whereof I affix my signature in the presence of two witnesses.

LEON KARPÓW.

Witnesses:
ANTONIO KARPÓW,
JAS. J. MCBRIDE.

---

Copies of this patent may be obtained for five cents each, by addressing the "Commissioner of Patents, Washington, D. C."